United States Patent [19]
Komanduri et al.

[11] Patent Number: 5,957,753
[45] Date of Patent: Sep. 28, 1999

[54] MAGNETIC FLOAT POLISHING OF MAGNETIC MATERIALS

[75] Inventors: Ranga Komanduri; Ming Jiang, both of Stillwater, Okla.

[73] Assignee: The Board of Regents for Oklahoma State University, Stillwater, Okla.

[21] Appl. No.: 09/000,915

[22] Filed: Dec. 30, 1997

[51] Int. Cl.[6] .............................. B24B 1/00; B24B 19/00
[52] U.S. Cl. .............................. 451/36; 451/28; 451/113
[58] Field of Search .............................. 451/36, 164, 165, 451/162, 113, 163, 28, 11

[56] References Cited

U.S. PATENT DOCUMENTS

| | | | |
|---|---|---|---|
| 3,660,942 | 5/1972 | Messerschmidt | 51/3 |
| 3,695,934 | 10/1972 | Feldhaus et al. | 134/1 |
| 4,216,629 | 8/1980 | DeGaeta | 51/125 |
| 4,306,386 | 12/1981 | Sakulevich et al. | 51/317 |
| 4,821,466 | 4/1989 | Kato et al. | 51/317 |
| 4,965,967 | 10/1990 | London | 51/289 |
| 5,048,238 | 9/1991 | Ikeda | 51/317 |
| 5,070,658 | 12/1991 | Rajner et al. | 51/316 |
| 5,185,957 | 2/1993 | Mizuguchi et al. | 51/59 SS |
| 5,214,884 | 6/1993 | Kinoshita et al. | 51/289 |
| 5,384,989 | 1/1995 | Shibano | 451/36 |
| 5,449,313 | 9/1995 | Kordonsky et al. | 451/36 |
| 5,460,566 | 10/1995 | Trahan | 451/326 |
| 5,575,706 | 11/1996 | Tsai et al. | 451/41 |
| 5,577,948 | 11/1996 | Kordonsky et al. | 451/35 |

OTHER PUBLICATIONS

Childs, et al; Magnetic Fluid Grinding of Ceramic Balls, Tribology Int'l, vol. 28, No. 6, pp. 341–348, Sep. 1995.

Childs, et al.; Magnetic Fluid Grinding of Ceramic Balls, Tribology Int.'l, vol. 28, No. 6, 00. 341–348, 1995.

Umehara, et al.; Principles of Magnetic Fluid Grinding of Ceramic Balls; *Applied Electromagnetics in Materials* 1 (1990) pp. 37–43.

U.S. application No. 08/940,254, Komandujri et al., filed Sep. 30, 1997.

Raghunadan, et al.; Magnetic Float Polishing of Ceramics; *Journal of Manufacturing and Science and Engineering*, vol. 119, pp. 001–009, Aug. 1997.

Komanduri, et al.; On the Possibility of Chemo–Mechanical Action in Magnetic Float Polishing of Silicon Nitride; *Journal of Tribology*, vol. 118, pp. 721–727, Oct. 1996.

Bhagavatula et al.; On chemical polishing of $Si_3N_4$ with $Cr_2O_3$; *Philosophical Magazine*, 1996 vol. 74, No. 4, 1003–1017.

Fox, et al, Magnetic Abrasive Finishing of Rollers, *Annals of the CIRP* vol. 43/1/1994.

N. Umehara et al., Magnetic fluid grinding of $HIP-Si_3N_4$ rollers, *WEAR*, 00 (1995) 000–000, pp. 1–8.

*Primary Examiner*—David A. Scherbel
*Assistant Examiner*—Philip J. Hoffmann
*Attorney, Agent, or Firm*—Fellers, Snider, Blankenship, Bailey & Tippens, P.C.

[57] ABSTRACT

A methodology for conducting magnetic float polishing of magnetic materials. This is accomplished by isolating the magnetic workpiece from any appreciable magnetic induction and subsequently polishing the magnetic workpiece utilizing the action of a magnetic buoyancy levitational force with conventional magnetic float polishing apparatus.

6 Claims, 2 Drawing Sheets

MAGNETIC FLOAT POLISHING OF MAGNETIC MATERIALS

STATEMENT REGARDING FEDERALLY SPONSORED RESEARCH

Work performed in connection with the development of the present invention was sponsored by grants from the National Science Foundation on "Design, Construction, and Optimization of Magnetic Field Assisted Polishing," (DMI-9402895) and "Tribological Interaction in Polishing of Advanced Ceramics and Glasses (CMS-9414610), and DoD's EPSCoR Program on "Finishing of Advanced Ceramics" (DAAH04-96-1-0323). The government may have rights in this invention.

BACKGROUND OF THE INVENTION

1. Field of the Invention

This invention relates generally to magnetic float polishing and, more specifically, to a methodology for conducting magnetic float polishing of workpieces made of magnetic materials such as steel balls for bearing applications.

2. Background

Magnetic float polishing (MPF), sometimes termed magnetic fluid grinding, is a "gentle" polishing technique based on the magneto-hydrodynamic behavior of a magnetic fluid that can float non-magnetic abrasive grains suspended in it. The magnetic fluid is generally a colloidal dispersion of extremely fine (100 to 150 Å) subdomain ferro-magnetic particles, usually magnetite ($Fe_3O_4$), in water or hydrocarbon based carrier fluids such as kerosene. The ferrofluids are made stable against particle agglomeration by the addition of surfactants.

When a magnetic fluid is placed in a magnetic field gradient, it is attracted towards the side having a higher magnetic field intensity. If a non-magnetic substance (e.g., abrasive grains in this case) is mixed in the magnetic fluid, it is discharged towards the side having a lower magnetic field intensity. When the field gradient is set in the gravitational direction, the non-magnetic material is made to float on the fluid surface by the action of a magnetic buoyancy levitational force. The process is considered highly effective for finish polishing because the levitational force is applied to the abrasive grains in a controlled manner. The forces applied by the abrasives to a workpiece set in the fluid are extremely small (about 1 N or less).

Though extremely effective at providing high-performance, polished surfaces, magnetic float polishing has been used to finish only non-magnetic materials, such as advanced ceramic balls for bearing applications, particularly alumina ($Al_2O_3$), zirconia ($ZrO_2$), silicon carbide (SiC) and silicon nitride ($Si_3N_4$). This limitation arises from the nature of the magnetic float polishing technique, which is based on the magnetohydrodynamic behavior of the magnetic fluid. Heretofore, magnetic fluid polishing has not been used in the finishing of magnetic materials, such as steel balls for bearing applications, as magnetic induction upon the workpiece would adversely impact the dynamics of the magnetic float polishing system.

The traditional manufacture of rolling element bearings of hardened chrome steels involves the rounding of cylindrical slugs followed by heat treatment, rough grinding, and finishing. The cylindrical slugs are cut from steel wire of proper size for the desired size of finished balls. These slugs are then rounded while in a soft "as cut" condition, such as by rolling the slugs between two plates which are rotated at low speed relative to each other. The rounded slugs are then heat-treated to harden them whereupon they are ground and lapped to form finished ball bearings. Surface finish is generally achieved by lapping with a diamond paste in oil. Lapping involves working the surface of the balls in a grooved track formed between two working surfaces. As the balls roll along the surfaces of the grooves, a sliding movement of varying magnitude is set up which constitutes the lapping force. This lapping force, in combination with suitable lapping agents, causes gradual altering of the balls to a substantially geometrically spherical shape.

Steel ball bearings are used extensively in industry for a myriad of applications. With the advent of vacuum melting technology, it is now possible to use steels with higher hot hardness, such as M50 tool steels, for applications requiring higher operating temperatures. However, the need to improve performance, conserve energy, and reduce costs to stay competitive has resulted in an increased emphasis on higher efficiency, higher load bearing capability, higher temperature capability, higher precision and rigidity, lower friction and wear, and longer and reliable life. Some believe that rolling contact steel bearings have reached their maximum potential and for many demanding applications alternate materials must be used as bearing elements.

It is in this environment that the use of ceramics with higher hardness, lower density, higher chemical stability, higher modulus, lower friction, and higher wear resistance than steel has arisen, and, in connection with the manufacture of ceramic ball bearings, the use of magnetic float polishing. Until the advent of magnetic float polishing, ceramic balls were finished using low polishing speeds (a few hundred rpm) and diamond abrasive as a polishing medium. It takes a considerable time (some 12–15 weeks) to finish a batch of ceramic balls in this fashion, and the use of diamond abrasives at high loads often results in deep pits, scratches and microcracks on the ceramic ball surface. Magnetic float polishing was developed to allow for higher removal rates and shorter polishing cycles by using high polishing speeds with very low level controlled forces and abrasives not much harder than the workpiece. Notwithstanding the successful use of ceramics in ball bearing applications, there remain drawbacks, including a relatively high cost of manufacture, their inherent brittleness, and lack of reliability in performance.

It is an object of the present invention to provide a method for conducting magnetic float polishing on magnetic workpieces, such as a steel balls, so that the advantages of magnetic float polishing may be applied to broader technologies such as the manufacture of rolling contact steel bearings to increase the potential for the use of lower cost steel ball bearings in demanding applications.

It is a further object of the invention that the method be performed utilizing existing magnetic float polishing hardware.

SUMMARY OF THE INVENTION

The present invention encompasses the magnetic float polishing of magnetic materials. This is accomplished by isolating the magnetic workpiece from any appreciable magnetic induction and subsequently polishing the magnetic workpiece utilizing the action of a magnetic buoyancy levitational force with a conventional magnetic float polishing apparatus.

The magnetic workpiece(s) is immersed in a magnetic fluid suspension which comprises a colloidal dispersion of magnetic particles in a carrier fluid and a quantity of non-magnetic abrasive grains. A magnetic field is applied to the magnetic fluid suspension to cause the magnetic particles to be attracted downward to an area of higher magnetic field intensity and to thereby create an upward magnetic buoyancy levitational force on the abrasive grains which pushes them to an area of lower magnetic field intensity (to the surface of the magnetic fluid suspension) and into a polishing position. The magnetic workpiece is set in the magnetic fluid suspension where it can be contacted by the abrasive grains; however, it is isolated from the magnetic field so that it receives only negligible, if any, magnetic induction. With the magnetic workpiece so isolated, magnetic fluid polishing is conducted under the action of the magnetic buoyancy levitational force.

The magnetic float polishing of magnetic materials may be conducted utilizing conventional apparatus of the type having a chamber for holding the magnetic fluid suspension and workpieces, beneath which a magnetic field is applied, and wherein a non-magnetic float, such as an acrylic float, is positioned in the suspension within the chamber. The chamber is filled with the magnetic fluid suspension and the float is set therein. The workpieces are located above the top surface of the float. The conventional purpose of the float is to produce a more uniform and larger polishing pressure upon the workpieces by taking the larger buoyant force near the magnetic poles and evenly distributing it to the workpieces.

In connection with the present invention, the magnetic workpieces are located in an area of negligible magnetic field intensity. In one aspect of the invention, and in additional to its conventional purpose, the float itself is also used to facilitate the establishment of the area of negligible magnetic field intensity. This is done by making the float of a sufficient thickness such that when the magnetic field is applied there is no appreciable magnetic field gradient in the area above the float where the workpieces are set. Increasing the thickness of the float increases the distance between the magnets and the top of the float, thereby minimizing the magnetic force component above the float. A spindle-driven shaft is fed down into the chamber to establish contact with the workpieces and presses them down to reach a desired force or height. The workpieces are polished under the action of the magnetic buoyancy levitational force when the spindle rotates.

In another aspect of the invention, during a final polishing stage a harder shaft material is used, preferably an advanced ceramic such as SiC, $B_4C$, $Al_2O_3$, or $Si_3N_4$. Also during this stage no abrasives are used, or, alternatively, softer chemomechanical abrasives are utilized, to obtain the best sphericity and surface finish possible.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention. As will be realized, the invention is capable of modifications in various obvious respects, all without departing from the scope of the invention. Accordingly, the description should be regarded as illustrative in nature and not as restrictive.

DETAILED DESCRIPTION OF THE PREFERRED EMBODIMENT

Before explaining the present invention in detail, it is important to understand that the invention is not limited in its application to the details of the construction and the steps illustrated herein. The invention is capable of other embodiments and of being practiced or carried out in a variety of ways. It is to be understood that the phraseology and terminology employed herein is for the purpose of description and not of limitation.

Figure 1:
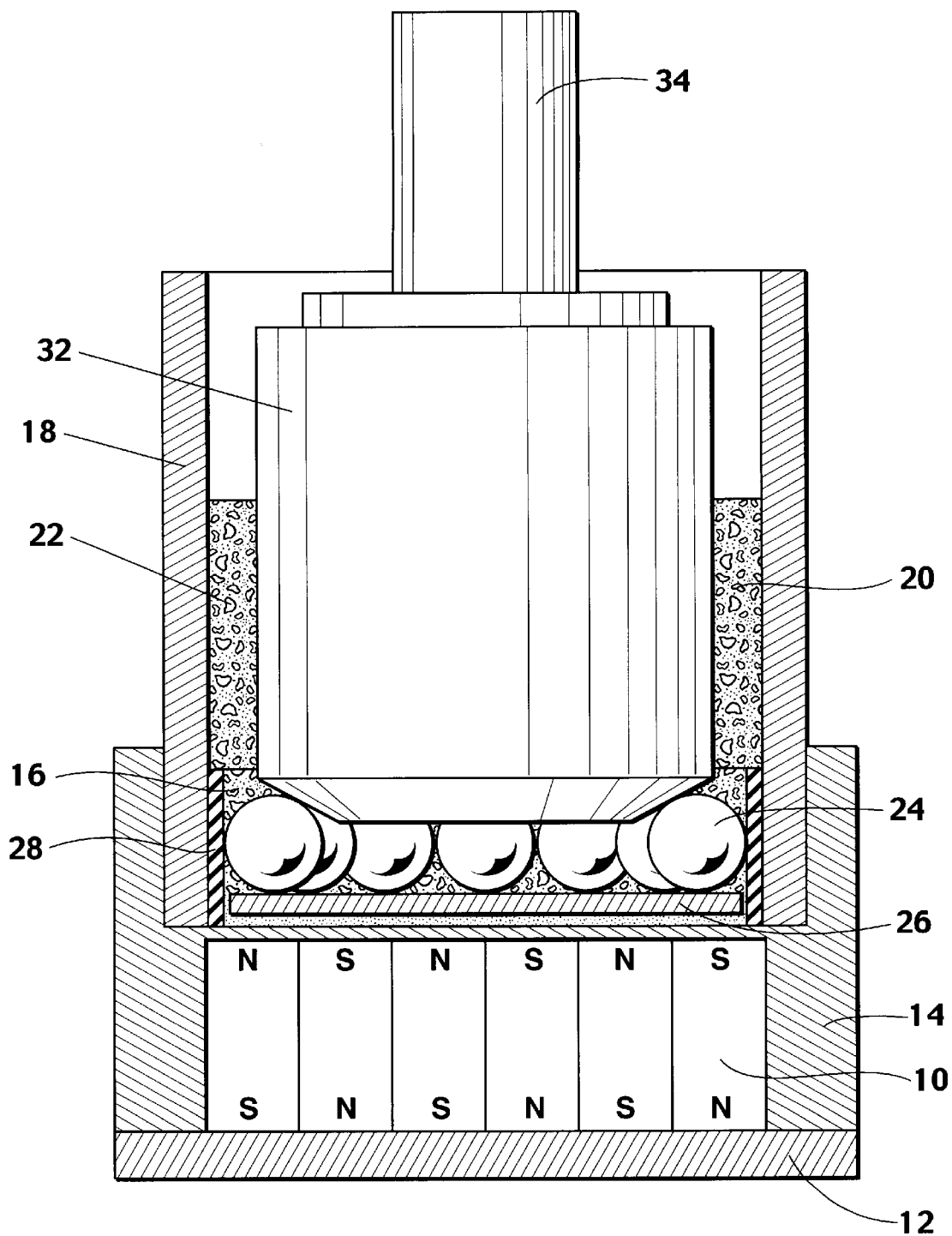
FIG. 1 is a schematic of a magnetic float polishing apparatus.

FIG. 1 is a schematic of a magnetic float polishing apparatus. Permanent magnets 10 are supported on a steel yoke 12 within an non-magnetic base 14. The magnets 10 are located with alternate N and S poles underneath a float chamber 16. Although permanent magnets are illustrated, it is within the scope of the invention to use an electromagnet instead of permanent magnets in order to achieve some flexibility in providing the desired magnetic field. A guide ring 18 is mounted on top of the float chamber 16 to hold a quantity of magnetic fluid 20. The base 14 and guide ring 18 define the float chamber 16 and are preferably made of aluminum, non-magnetic austenitic stainless steel, ceramic or acrylic materials. The magnetic fluid 20 preferably contains 5–10% by volume of fine abrasive particles 22. As used herein the term "magnetic fluid suspension" means the combination of the magnetic fluid 20 and abrasive particles or grains 22. Typical abrasive grains 22 are $B_4C$ and SiC, but the invention is not limited to the use of any particular abrasive materials. Workpieces 24 are held in a 3-point contact between a lightweight, non-magnetic float 26, such as an acrylic float, at the bottom, a rubber ring 28 glued to the inner surface of the guide ring 18 on the side, and the beveled edge 30 of a drive shaft 32 at the top. The drive shaft 32 is connected to the spindle 34 of a milling machine or other spindle capable of operating in a speed range up to 6,000 to 10,000 rpm. As described hereinabove, the magnetic fluid 20 is a colloidal dispersion of extremely fine (100 to 150 Å) subdomain ferromagnetic particles, usually magnetite ($Fe_3O_4$), in a carrier fluid, such as water or kerosene. It is made stable against particle agglomeration by coating the particles with an appropriate surfactant.

When a magnetic field is applied, the magnetic particles in the magnetic fluid 20 are attracted downward to an area of higher magnetic field intensity and an upward magnetic buoyancy levitational force is exerted on all non-magnetic materials to push them upward to an area of lower magnetic field intensity. The abrasive grains 22 and float 26, being non-magnetic materials, are levitated by the magnetic buoyancy levitational force. The drive shaft 32 is fed down to contact with the workpieces 24 (3-point contact) and presses them down to reach the desired force or height. The workpieces 24 are polished by the abrasive grains 22 under the action of the magnetic buoyancy levitational force when the spindle 34 rotates. Reference is made Applicants' copending U.S. patent application Ser. No. 08/940,254, filed Sep. 30, 1997, which discloses magnetic float polishing processes and materials therefor, the same being incorporated herein by reference.

In connection with the present invention, the workpieces 24 are magnetic materials, and, for illustrative purposes, ball blanks such as steel balls for bearing applications. The magnetic workpieces 24 are immersed in the magnetic fluid suspension atop the float 26, but are isolated from the magnetic field to avoid any appreciable magnetic induction. This allows the magnetic workpieces 24 to be finished in a manner similar to ceramic balls. Once the magnetic field is applied to the magnetic fluid suspension, the magnetic particles therein are attracted downward to an area of higher magnetic field intensity (or magnetic flux density). This creates an upward magnetic buoyancy levitational force on the abrasive grains 22 and the float 26 which pushes them to an area of lower magnetic field intensity. Abrasive grains 22 between the float 26 and the workpieces 24 are pushed onto the workpieces 24 and polishing or finishing occurs as the abrasive grains 22 and workpieces 24 move against each other.

The magnetic workpieces 24 are isolated from magnetic induction by ensuring that the workpieces 24 are a spaced far enough away from the top of the magnets 10 that they are in an area of negligible magnetic field intensity. In the case of finishing non-magnetic materials, such as ceramic balls, the downward acting forces are those due to the weight of the balls (gravity force) and the polishing forces acting on the balls. The latter is typically ~1 N/ball. In the case of magnetic materials, such as steel balls, there are two additional forces to consider. First, as the density of magnetic balls, such as steel balls, is much higher (~40%) than ceramic balls, the downward gravity force is higher. Secondly, there is an additional downward magnetic force due to the attraction of the magnetic material towards the magnets. To effectively accomplishing magnetic float polishing of magnetic balls, the magnetic buoyancy levitational force has to overcome these two extra forces. Accordingly, the net magnetic buoyancy levitational force acting on the bottom of the float 26 upwards should be equal to or greater than the sum of the gravity force acting on the balls, the downward magnetic force due to magnetic induction, plus the polishing force applied on the balls by the abrasive. Otherwise, the float 26 will sink to the bottom of the chamber 16 and will not be free to rotate during polishing. A minimum gap (~0.5–1.0 mm) between the bottom of the chamber 16 and the float 26 should also be maintained to allow the float 26 to properly operate. If the magnetic workpieces 24 are located at or near the distance where the magnetic field intensity is very small or negligible, then the downward magnetic force component due the balls is negligible. This can be accomplished by increasing the distance between the magnets 10 and the top of the float 26.

Since the magnetic field decreases rapidly as the distance from the magnets 10 increases, one way to facilitate isolation of the magnetic workpieces 24 from the magnetic field is by making the float 26 of a thickness sufficient to effectively minimize the downward magnetic force component of the magnetic ball material. Consequently, when the magnetic field is applied there is no appreciable magnetic field gradient in the area above the float 26 and negligible magnetic induction upon the magnetic workpieces 24. Another way to minimize magnetic induction upon the balls is to vary the thickness of the floor of the magnetic fluid chamber 16. Still further, the position of the workpieces 24 in the chamber 16 may also be controlled by careful setting of the drive shaft 32, which is fed down to contact with the workpieces 24 and presses them down to reach the desired force or height. Whatever means is used to achieve it, the critical aspect is to obtain a physical separation between the balls and the top of the magnets that is sufficient to effectively isolate the balls from any appreciable magnetic induction.

The magnetic field strength is maximum at the face of the magnets 10 and decreases rapidly with increasing distance from the magnets 10 till it becomes vanishingly small at higher distance. As one example of the preferred embodiment, the magnetic flux density at the face of the magnets 10 (6 mm width) is ~1.5 KGauss. At 1 mm it drops to 0.7, at 2.5 mm it is 0.26, at 6 mm it is 0.175 and at 7.5 mm it is practically zero. The conventional magnetic float polishing apparatus as hereinabove described is constructed to take into account these dimensions such that during operation the top surface of the float 26 upon which the workpieces 24 are set defines an area of negligible magnetic field intensity.

Figure 2:
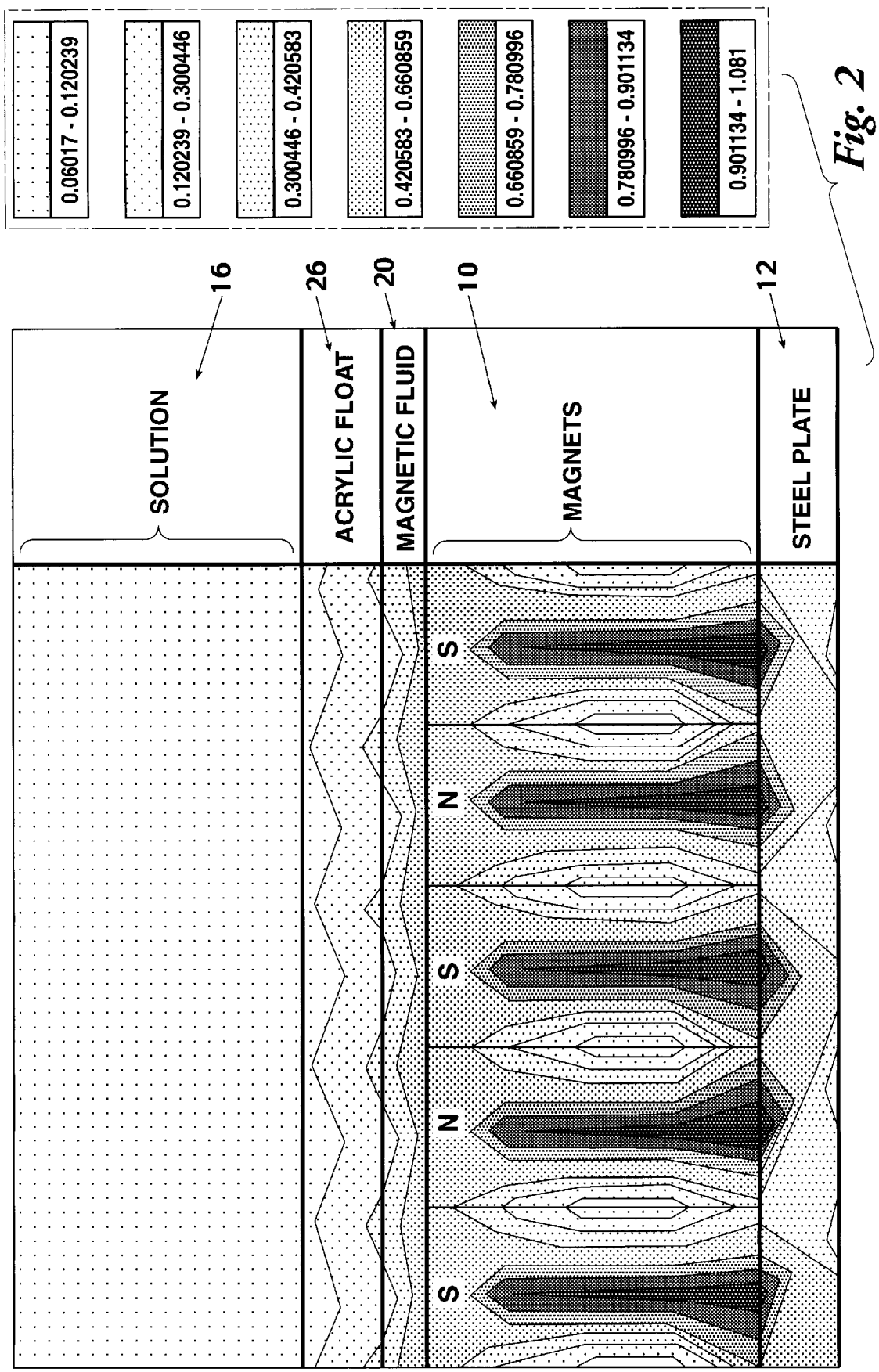
FIG. 2 is a contour map of the magnetic field intensity by ANSYS simulation of magnetic float polishing using permanent magnets.

FIG. 2 is a typical magnetic flux density plot from FEM analysis illustrating the varying magnetic field intensity achieved in connection with the practice of the preferred embodiment of the invention. Permanent magnets 10 are supported on the steel yoke or plate 12 with alternate N and S poles underneath the float chamber 16. The magnetic fluid 20 is contained in the chamber 16, and set in the magnetic fluid 20 is the acrylic float 26. The unit of measurement is the Tesla.

As is seen in FIG. 2, the magnetic flux density in the area just above the magnets 10 is in the range of 0.45 to 0.55. The magnetic flux density dissipates over distance such that at the bottom surface of the float 16 the flux density ranges from about 0.25 to 0.45. A critical reading is obtained at the top surface of the float 16 which is where the workpieces 24 are located during polishing. At this point the flux density ranges from around 0.00 to 0.15. The upper surface of the float 16 and the area thereabove is thus defined as an area of negligible magnetic field intensity. When positioned in this area the workpieces 24 are thus isolated from any appreciable magnetic induction. In conjunction with the present invention, the term "negligible" or "not appreciable" when used to refer to magnetic induction upon the workpieces 24 means an absence of significant induction. Significant induction is that which would exceed the net magnetic buoyancy levitational force acting on the bottom of the float 26 upwards when summed with the weight of the balls and the force applied on the balls by the abrasive.

Another aspect of the present invention further facilitates the finishing of magnetic materials by magnetic float polishing. While in the case of ceramic balls a non-magnetic austenitic stainless steel shaft 32 is generally used, such is not acceptable in the final finishing stages for the polishing of steel balls. While for roughing and semi-finishing stages it is possible to use a steel shaft 32, in order to obtain the best sphericity and finish it was found necessary to use a harder shaft material, perferably an advanced ceramic such as SiC, $B_4C$, $Al_2O_3$, or $Si_3N_4$, for final stage finishing. Additionally, it is preferred that during this stage to use either no abrasive or softer abrasives that can participate in the chemo-mechanical action between the balls, the abrasives and the environment. While in the case of ceramic balls, it is desired to minimize the influence of hard abrasives in causing brittle fracture leading to microfracture of the balls, in the case of softer steel balls it is necessary to minimize the plastically deformed groove formation or scratching made by the harder abrasives. Once the material from the balls is removed to the final dimensions, improvements in sphericity and finish can be obtained by taking advantage of microbrinelling of the surfaces of the balls by the hard advanced ceramic shaft 32. In this way, fine amounts of material are either removed from the tips of the surface or deformed locally (or redistributed) to obtain the best sphericity and finish. Without this it is practically impossible to obtain bearing grade balls economically.

Thus, the present invention can be utilized to successfully polish magnetic materials such as stainless steel balls by magnetic float polishing. The technique is far superior to the state of the art where serious problems are encountered due to residual stresses induced during polishing and various heat treatment cycles to which the balls are subjected. The invention enables use of the balls in their hardened state for polishing, thereby eliminating substantial processing time.

While the invention has been described with a certain degree of particularity, it is manifest that many changes may be made without departing from the spirit and scope of the invention. It is understood that the invention is not limited to the embodiment(s) set for herein for purposes of exemplification, but is to be limited only by the scope of the attached claim or claims, including the full range of equivalency to which each element thereof is entitled.

What is claimed is:

1. A method for conducting the final finishing stage of magnetic float polishing on a magnetic workpiece in a magnetic float polishing apparatus of the type having a chamber to hold a magnetic fluid suspension, a non-magnetic float set in the suspension within the chamber above a chamber floor, the top surface of the float defining a polishing area, a polishing shaft, and magnet means located beneath the chamber for applying a magnetic field to the suspension, comprising:

immersing the magnetic workpiece in the magnetic fluid suspension in the polishing area above the top surface of the float;

applying a magnetic field to the magnetic fluid suspension from beneath the chamber to create an upward magnetic buoyancy levitational force acting on the bottom of the float;

regulating the upward magnetic buoyancy levitational force so that the levitational force equals or exceeds the sum of the gravity force acting upon the magnetic workpiece, polishing forces acting upon the magnetic workpiece and any downward magnetic force arising from magnetic induction upon the magnetic workpiece and is sufficient to establish a gap of at least 0.5 mm between the chamber floor and the bottom of the float; and contacting the magnetic workpiece with the polishing shaft, wherein the shaft is formed of an advanced ceramic material, and polishing the magnetic workpiece under the action of the magnetic buoyancy levitational force.

2. The method according to claim 1 wherein the magnetic fluid suspension contains no abrasives.

3. The method according to claim 1 wherein the magnetic fluid suspension contains chemo-mechanical abrasives having a hardness substantially equivalent to the hardness of the workpiece.

4. A method for conducting magnetic float polishing on a magnetic workpiece in a magnetic float polishing apparatus of the type having a chamber to hold a magnetic fluid suspension, a non-magnetic float set in the suspension within the chamber above a chamber floor, the top surface of the float defining a polishing area, a polishing shaft, and magnet means located beneath the chamber for applying a magnetic field to the suspension, comprising:

immersing the magnetic workpiece in the magnetic fluid suspension in the polishing area above the top surface of the float, the magnetic fluid suspension comprising a colloidal dispersion of magnetic particles in a carrier fluid and a quantity of non-magnetic abrasive grains;

applying a magnetic field to the magnetic fluid suspension from beneath the chamber floor to cause the magnetic particles to be attracted downward to an area of higher magnetic field intensity and to thereby create an upward magnetic buoyancy levitational force acting on the bottom of the float;

regulating the upward magnetic buoyancy levitational force so that the levitational force equals or exceeds the sum of the gravity force acting upon the magnetic workpiece, polishing forces acting upon the magnetic workpiece and any downward magnetic force arising from magnetic induction upon the magnetic workpiece and is sufficient to establish a gap of at least 0.5 mm between the chamber floor and the bottom of the float; and polishing the magnetic workpiece utilizing the abrasive grains under the action of the magnetic buoyancy levitational force.

5. The method according to claim 1 further comprising selecting a magnetic field strength and a float thickness whereby the magnetic flux density at the top surface of the float when the magnetic field is applied ranges from 0.00 to 0.15 Tesla.

6. The method according to claim 4 wherein the magnetic particles are extremely fine (100–150 Å) subdomain ferromagnetic particles and the carrier fluid is water or hydrocarbon based.

* * * * *